(12) United States Patent
Gao et al.

(10) Patent No.: US 8,947,996 B2
(45) Date of Patent: Feb. 3, 2015

(54) OFFSET MODULATION ORTHOGONAL FREQUENCY DIVISION MULTIPLEXING (OFDM) AND MULTI-ACCESS TRANSMISSION METHOD WITH CYCLIC PREFIX (CP)

(75) Inventors: Xiqi Gao, Nanjing (CN); Wenjin Wang, Nanjing (CN); Xiaohu You, Nanjing (CN); Xianggen Xia, Nanjing (CN); Guochen Ou, Nanjing (CN)

(73) Assignee: Southeast University, Nanjing (CN)

( * ) Notice: Subject to any disclaimer, the term of this patent is extended or adjusted under 35 U.S.C. 154(b) by 206 days.

(21) Appl. No.: 13/574,773

(22) PCT Filed: Dec. 31, 2010

(86) PCT No.: PCT/CN2010/080631
§ 371 (c)(1),
(2), (4) Date: Sep. 20, 2012

(87) PCT Pub. No.: WO2011/088734
PCT Pub. Date: Jul. 28, 2011

(65) Prior Publication Data
US 2013/0148488 A1 Jun. 13, 2013

(30) Foreign Application Priority Data

Jan. 22, 2010 (CN) .......................... 2010 1 0018295

(51) Int. Cl.
*H04J 11/00* (2006.01)
*H04L 27/26* (2006.01)

(52) U.S. Cl.
CPC ........ *H04L 27/2697* (2013.01); *H04L 27/2698* (2013.01); *H04L 27/2607* (2013.01)
USPC .......................................... 370/208; 370/210

(58) Field of Classification Search
CPC .... H04I 27/2697; H04L 27/2698; H04J 11/00
USPC ................................. 370/210, 208
See application file for complete search history.

(56) References Cited

U.S. PATENT DOCUMENTS

2008/0137723 A1* 6/2008 Liu ............................... 375/235
2011/0110458 A1* 5/2011 Siohan et al. ................. 375/295

FOREIGN PATENT DOCUMENTS

| CN | 1606298 A | 4/2005 |
| CN | 1809047 A | 7/2006 |
| CN | 101795257 | 8/2010 |

OTHER PUBLICATIONS

Hao Lin and Pierre Siohan; A New Transceiver system for the OFDM/OQAM Modulation with Cyclic Prefix; Dec. 2008.
Jinfeng Du and Svante Signell; Classic OFDM Systems and Pulse Shaping OFDM/OQAM Systems; Feb. 2007; pp. 1-31; ISSN 1653-7238.

* cited by examiner

*Primary Examiner* — Sai-Ming Chan
(74) *Attorney, Agent, or Firm* — Ann I. Dennen; Lanier Ford Shaver & Payne P.C.

(57) ABSTRACT

The present invention provides an Offset Modulation Orthogonal Frequency Division Multiplexing (OFDM) and multi-access transmission method with a Cyclic Prefix (CP), including a generating method of the sent signal in the sending terminal and a processing method of the received signal in the receiving terminal, the method includes: in the sending terminal, performing generalized discrete Fourier Transform on real-value digital baseband modulated symbols and obtaining the frequency-domain signal; performing conjugate symmetric extension, frequency-domain filtering, sub-carrier mapping on the frequency-domain signal; performing Inverse Fast Fourier Transform on the frequency-domain signal after sub-carrier mapping; inserting a CP and obtaining the time-domain sent signal; in the receiving terminal, including: removing the CP, performing Fast Fourier Transform on CP removed symbols and obtaining the frequency-domain received signal; and based on multiple user joint frequency-domain equalization performing iterative detection decoding on the frequency-domain received signal. The present invention can obtain the low-signal envelope volatility in the condition of remaining spectrum efficiency, and adopting iterative received signal processing method based on multiple user joint frequency-domain equalization ensures the transmission reliability with low-complexity.

7 Claims, 3 Drawing Sheets

OFFSET MODULATION ORTHOGONAL FREQUENCY DIVISION MULTIPLEXING (OFDM) AND MULTI-ACCESS TRANSMISSION METHOD WITH CYCLIC PREFIX (CP)

TECHNICAL FIELD

The present invention relates to the technical field of communication, in particular to a method for generating transmitted signals and processing received signals in communication system.

BACKGROUND OF THE INVENTION

With advantages such as simple implementation, robustness against frequency selective fading, and support for multi-antenna technique, etc., Orthogonal Frequency Division Multiplexing (OFDM) has become an effective technique supporting high-speed wireless communication. However, OFDM has the drawback of high envelope fluctuations during signal transmission, thus the power efficiency of OFDM is limited, especially when OFDM is applied in uplinks in wireless communication system. The Single Carrier-Frequency Division Multiple Access (SC-FDMA) technique put forth in recent years has overcome the drawback of high envelope fluctuations during signal transmission of OFDM, and can be implemented by means of DFTS (Discrete Fourier Transform Spreading)-OFDM. Therefore, SC-FDMA becomes a key technique for uplinks in wireless communication.

In a SC-FDMA system based on DFTS-OFDM, the transmitted data vector of each user is pre-coded with DFT matrix before it is mapped to the sub-carrier of OFDM system. The resultant transmitted signals all have lower envelope fluctuation, no matter they are measured with Peak to Average Power Ratio (PAPR) or Cubic Metric (CM). Therefore, higher power efficiency and signal coverage can be obtained in the uplink. At the receiving end of the system, the inter-symbol interference caused by frequency selective fading channel can be suppressed by frequency domain equalization with low complexity. The envelope fluctuation of transmitted signals can be further reduced by frequency domain pulse shaping. In conventional single carrier transmission, though the envelope fluctuation of transmitted signals can be reduced with increase of the roll-off factor of pulse shaping, the spectral efficiency loses at the same time. The object of the present invention is to reduce envelope fluctuation of transmitted signals without loss of spectral efficiency.

In frequency selectivity channels, OQAM (Offset Quadrature Amplitude Modulation)-OFDM transmission usually loses its orthogonality; as a result, the influence of inter-channel interference (ICI) and inter-symbol interference (ISI) has to be eliminated with a more complex equalization method at the receiving end. That drawback hampers the application of OQAM-OFDM in actual systems. An essential idea of the present invention is to introduce a cyclic prefix (CP) into OQAM-OFDM transmission, to obtain an equalization method with low complexity by utilizing the block transmission and cyclic convolution features of cyclic prefix.

SUMMARY OF THE INVENTION

Technical Problem

The embodiment of the present invention provides an OM (offset modulation)-OFDM transmission method with cyclic prefix, comprising method for generating transmitted signals and method for processing received signals. In the method for generating transmitted signals, OQAM technique is used, to reduce signal envelope fluctuation while maintaining the spectral efficiency. At the receiving end, a signal processing method based on iterative detection decoding is employed, to ensure reliability of transmission without loss of spectral efficiency. With the block transmission feature of cyclic prefix, both the method for generating transmitted signals and the method for processing received signals can be implemented with a frequency domain implementation method having low complexity. The reliability of transmission is ensured at lower complexity by using an iterative received signal processing method based on multi-user combined frequency domain equalization.

Technical Scheme

The OM-OFDM transmission method with cyclic prefix provided in the present invention comprises a method for generating transmitted signals and a method for processing received signals, wherein, the method for generating transmitted signals includes the following steps:

a. Performing channel encoding and symbol mapping for the transmitted information bits, to obtain digital baseband modulation symbols with real values;

b. Dividing the digital baseband modulation symbols into K streams, wherein, K is a positive integer;

c. Performing serial/parallel conversion in length $2N_d$ for the digital baseband modulation symbols in stream k, to obtain a transmitted symbol vector $d_{k,l}$ in length $2N_d$ in the stream, wherein, N, is a positive integer, subscript l represents sequence number of block $d_{k,l}=[d_{k,l}(0), \ldots d_{k,l}(2N_d-1)]^T$, and $(\bullet)^T$ represents conjugate transpose operation;

d. Performing cyclic convolution for the transmitted symbols in each stream with the coefficient of time domain pulse shaping filter for the stream, and modulating the result through OQAM to the frequency band corresponding to the stream, to obtain the digital baseband signals in the stream;

e. Combining the digital baseband signals in all streams by summing, to obtain the transmitted signals, to which a cyclic prefix will be inserted;

f. Inserting a cyclic prefix, to obtain digital baseband transmitted signals; wherein the method for processing received signals comprises the following steps:

g. Removing cyclic prefix from the received signals;

h. Performing band-pass filtering for the received signals for each stream, and performing combined equalization, demodulation, and decoding for multi-streams.

The transmitted symbol vector of stream K is $d_{k,l}$, wherein, $k=0, \ldots, K-1$; the procedure of generating digital baseband transmitted signals comprises the following steps:

multiplying the element n in $d_{k,l}$ by a modulation factor $e^{-j\pi n/(2N_d)}$, wherein, $n=0, \ldots 2N_d-1$, $j=\sqrt{-1}$ then, performing Fast Fourier Transform (FFT) at $2N_d$ point for the resultant vector, to obtain a frequency domain transmitted signal vector $q_{k,l}$, wherein, $q_{k,l}=[q_{k,l}(0), \ldots, q_{k,l}(2N_d-1)]^T$;

taking the first $N_d$ signals in the frequency domain transmitted signal vector $q_{k,l}$, and performing conjugate symmetric expansion for the signals, to obtain a transmitted signal vector $p_{k,l}$ after frequency domain expansion in $N_s=N_d+2N_e$ dimension, as follows:

$$p_{k,l}=[q_{k,l}(N_d-N_e) \ldots q^*_{k,l}(N_d-1)q^*_{k,l}(N_d-1) \ldots q^*_{k,l}(0)q_{k,l}(0) \ldots q_{k,l}(N_e-1)]^T,$$

wherein, $N_e$ is a non-negative integer which is not greater than $N_d/2$ multiplying the element i in the transmitted signal vector $p_{k,l}$ after frequency domain expansion by the coefficient of frequency domain filter w(i), and then multiplying the result by $j^k$, and assigning the obtained value to the element $((kN_d+k_0-\lfloor N_d/2 \rfloor-N_e+i))_{N_c}$ in a vector $x_{k,l}$ in $N_c$ dimensions, with all other elements in $x_{k,l}$ being set to 0, wherein, $k_0$ is an integer, $N_c$ is the total sub-carriers number in the system, and $((M))_N$ represents the remainder of M divided by N;

Summing up $x_{k,l}$ generated in each stream to obtain $x_l$ performing Inverse Fast Fourier Transform (IFFT) at $N_c$ point to obtain $s_l$, and then after serial/parallel conversion, inserting a cyclic prefix, to generate transmitted signals.

The coefficient of frequency domain filter w(i) is:

$$w(i) = \begin{cases} c(i) & 0 \le i \le 2N_e - 1 \\ \sqrt{2}, & 2N_e \le i \le N_d - 1 \\ c(N_s - 1 - i), & N \le i \le N_s - 1, \end{cases}$$

wherein, $c(i)=\sqrt{1-\cos(\pi(i+0.5)/2/N_e)}$, $0 \le i \le 2N_e-1$ and $\pi$ is circumference ratio.

The present invention further provides a multi-access transmission method based on OM-OFDM with cyclic prefix, including method for generating transmitted signals and method for processing received signals, wherein, the method for generating transmitted signals of the user u includes the following steps:

4a. performing channel encoding and symbol mapping for the transmitted information bits, to obtain digital baseband modulation symbols with real values;

4b. performing serial/parallel conversion in length $2N_d$ for the digital baseband modulation symbols, to obtain a transmitted symbol vector $d_{u,l}$;

4c. performing cyclic convolution for the transmitted symbols with the coefficient of pulse shaping filter of the user, and modulating the result in OQAM mode to the frequency band corresponding to the user, to obtain the digital baseband signals of the user;

4d. inserting cyclic prefix, to obtain digital baseband transmitted signals; wherein, the method for processing received signals includes the following steps:

4e. removing cyclic prefix from the received signals;

4f. performing band-pass filtering for the received signals for each user, and performing combined frequency domain equalization for multi-users, demodulation, and decoding.

In the method for generating transmitted signals, the procedure of generating digital baseband transmitted signals from the transmitted symbol vector $d_{u,l}$ includes the following steps:

multiplying the element n in $d_{k,l}$ by a modulation factor $e^{-j\pi n/(2N_d)}$, wherein, $n=0,\ldots 2N_d-1$, $j=\sqrt{-1}$, then, performing Fast Fourier Transform (FFT) at $2N_d$ point for the resultant vector, to obtain a frequency domain signal vector $q_{u,l}$;

taking the first $N_d$ signals in the frequency domain transmitted signal vector $q_{u,l}$, and performing conjugate symmetric expansion for the signals, to obtain a transmitted signal vector $p_{u,l}$ after frequency domain expansion in $N_s=N_d+2N_e$ dimensions, $p_{u,l}=[q_{u,l}(N_d-N_e)\ldots q_{u,l}(N_d-1)q_{u,l}^*(N_d-1)\ldots q_{u,l}^*(0)q_{u,l}(0)\ldots q_{u,l}(N_e-1)]^T$, wherein, $N_e$ is a non-negative integer which is not greater than $N_d/2$;

multiplying the element i in the transmitted signal vector $p_{u,l}$ after frequency domain expansion by the coefficient of frequency domain filter w(i), and then multiplying the result by $j^u$, and assigning the obtained value to the element $((uN_d+k_0-\lfloor N_d/2 \rfloor-N_e+i))_{N_c}$ in a vector $x_{u,l}$ in $N_c$ dimensions, with all other elements in $x_{u,l}$ being set to 0, wherein, $k_0$ is an integer that is identical for all users, $N_c$ is the total sub-carrier number in the system, and $((M))_N$ represents the remainder of M divided by N In the method for processing received signals, the procedure of performing band-pass filtering for each user and performing multi-user combined frequency domain equalization, demodulation, and decoding is performed by using an iterative detection decoding method based on multi-user combined equalization, and includes procedures of:

performing Fast Fourier Transform (FFT) at $N_c$ point for the received signals after the cyclic prefix is removed;

performing multi-user combined frequency domain equalization with priori information;

performing soft demodulation to calculate the bit log likelihood ratio according to the equalized output;

performing soft-input and soft-output decoding;

calculating the mean value according to the bit log likelihood ratio of the decoder output and reconstructing the variance.

The procedure of performing multi-user combined frequency domain equalization by utilizing priori information includes:

calculating the coefficient of receiving frequency domain filter $w_{u,l}(i)$ according to the mapping relation between channel parameters and sub-carriers at the transmitting end, wherein, $u=0, 1, \ldots, K-1$, $i=0, \ldots, N_c-1$;

calculating intermediate coefficient vectors $\tilde{c}_{u,l}^{(t)}$, $\hat{c}_{u,l}^{(t)}$, and $\check{c}_{u,l}^{(t)}$ for combined frequency domain equalization according to the coefficient of frequency domain filter, wherein, $u=0, 1, \ldots, K-1$, $t=1, 2, 3$.

calculating intermediate signal vectors for combined frequency domain equalization $\hat{p}_{u,l}^{(t)}$, according to the signals of each user after band-pass filtering and the intermediate coefficient vectors $\tilde{c}_{u,l}^{(t)}$, $\hat{c}_{u,l}^{(t)}$, and $\check{c}_{u,l}^{(t)}$ for frequency domain equalization, wherein, $u=0, 1, \ldots, K-1$, $t=1, 2, 3$;

obtaining the equalized output $\hat{d}'_{u,l}$ and $\overline{\Omega}_u$ of user u, according to the intermediate coefficient vectors for combined frequency domain equalization, intermediate signal vectors for combined frequency domain equalization, noise variance, and reconstructed mean value and mean variance of transmitted symbols.

In the method for processing received signals, the procedure of performing combined frequency domain equalization for multi-users by utilizing priori information includes:

calculating the coefficient of receiving frequency domain filter $w_{u,l}(i)$, wherein, $u=0, 1, \ldots, K-1$, $i=0, \ldots, N_s-1$, $$w_{u,l}(i)=j^{-u}w(i)\xi_{u,l}(M_u^{-1}(i))$$

wherein, $\xi_{u,l}(n)$ represents the channel parameters of sub-carrier n for block l of user u, $M_u(i)$ represents a mapping, i.e., mapping frequency domain signal $M_u(i)$ to sub-carrier i, and $M_u^{-1}(i)$ represents the inverse mapping;

calculating intermediate coefficient vectors $\tilde{c}_{u,l}^{(t)}$, $\hat{c}_{u,l}^{(t)}$, and $\check{c}_{u,l}^{(t)}$ for combined frequency domain equalization, wherein, $u=0, 1, \ldots, K-1$, $t=1, 2, 3$.

$$\tilde{c}_{u,l}^{(1)} = [0_{1\times(N_d-2N_e)}(w_{u,l}^* \square w_{u,l})^T]^T,$$

$$\hat{c}_{u,l}^{(1)} = \left(\tilde{c}_{((u+1))_K,l}^{(1)}\right)^* = \left[0_{1\times(N_d-2N_e)}\left((w_{u,l}^{(R)})^* \square w_{((u+1))_K,l}^{(L)}\right)^T\right]^T,$$

$$\tilde{c}_{u,l}^{(2)} = \tilde{c}_{u,l}^{(1)} + \tilde{Q}\tilde{c}_{u,l}^{(1)},$$

-continued $$\hat{c}_{u,l}^{(2)} = \left(\bar{c}_{((u+1))_K,l}^{(2)}\right)^* = \hat{c}_{u,l}^{(1)} + \text{diag}(0, J_{2N_e})(\hat{c}_{u,l}^{(1)})^*,$$

$$\tilde{c}_{u,l}^{(3)} = \begin{bmatrix} \Gamma_{((u-1))_K}\left(\tilde{c}_{((u-1))_K,l}^{(2,R)} + \frac{\sigma_\eta^2}{\overline{v}_{((u-1))_K}} 1_{N_d \times 1}\right) \\ \Gamma_u\left(\tilde{c}_{((u+1))_K,l}^{(2,L)} + \frac{\sigma_\eta^2}{\overline{v}_{((u+1))_K}} 1_{N_d \times 1}\right) \end{bmatrix},$$

$$\hat{c}_{u,l}^{(3)} = -\Gamma_u \hat{c}_{u,l}^{(2)},$$

$$\tilde{c}_{u,l}^{(3)} = -\Gamma_{((u-1))_K}(\hat{c}_{((u-1))_K,l}^{(2)})^*,$$

wherein, $w_{u,l}=[w_{u,l}(0)\ w_{u,l}(1)\ \ldots\ w_{u,l}(N_s-1)]^T=[(w_{u,l}^{(L)})^T (w_{u,l}^{(M)})^T (w_{u,l}^{(R)})^T]^T$ is the (L) (R) coefficient vector of receiving frequency domain filter, $w_{u,l}^{(L)}$ and $w_{u,l}^{(R)}$ are vectors in $2N_e$ dimensions, $(\square)^*$ represents conjugating operation, and $\text{diag}(A,B)$ represents a block diagonal matrix composed of matrix A and B; $\sigma_\eta^2$ is the variance of white noise at the receiving end, $J_N$ represents the inverse identical transform matrix at N point, $\overline{v}_u$ is the mean variance of user u, $\tilde{c}_{u,l}^{(2,L)}$ and $\tilde{c}_{u,l}^{(2,L)}$ are vectors in $N_d$ dimensions that fulfill $[(\tilde{c}_{u,l}^{(2,L)})^T(\tilde{c}_{u,l}^{(2,R)})^T]^T=\tilde{c}_{u,l}^{(2)}$, and $$\tilde{Q} = \begin{bmatrix} J_{2N_d-2N_e} & \\ & J_{2N_e} \end{bmatrix}$$

$$\Gamma_u = \left(\text{diag}\left(\tilde{c}_{u,l}^{(2,R)} + \frac{\sigma_\eta^2}{\overline{v}_u} 1_{N_d \times 1}\right) \square \left(\tilde{c}_{((u+1))_K,l}^{(2,L)} + \frac{\sigma_\eta^2}{\overline{v}_{((u+1))_K}} 1_{N_d \times 1}\right) - (\hat{c}_{u,l}^{(2)})^* \square \hat{c}_{u,l}^{(2)}\right)^{-1};$$

calculating the intermediate signal vector $\hat{p}_{u,l}^{(t)}$ for combined frequency domain equalization, wherein, $u=0, 1, \ldots, K-1, t=1, 2, 3,$ $$\hat{p}_{u,l}^{(1)} = Q^T \tilde{W}_{2N_d} \mu_{u,l},$$

$$\hat{p}_{u,l}^{(2)} = \overline{p}_{u,l} + \tilde{Q}(\overline{p}_{u,l})^* - \hat{c}_{u,l}^{(2)} \square \hat{p}_{u,l}^{(1)} - \begin{bmatrix} \tilde{c}_{u,l}^{(2)} \square \hat{p}_{((u-1))_K,l}^{(1,R)} \\ \hat{c}_{u,l}^{(2)} \square \hat{p}_{((u+1))_K,l}^{(1,L)} \end{bmatrix},$$

$$\hat{p}_{u,l}^{(3)} = \tilde{c}_{u,l}^{(3)} \square \hat{p}_{u,l}^{(2)} + \begin{bmatrix} \tilde{c}_{u,l}^{(3)} \square \hat{p}_{((u-1))_K,l}^{(2,R)} \\ \hat{c}_{u,l}^{(3)} \square \hat{p}_{((u+1))_K,l}^{(2,L)} \end{bmatrix},$$

wherein, $\overline{p}_{u,l}^{(t)}=[0_{1\times(N_d-2N_e)}(w_{u,l}^*\square y_{u,l})^T]^T$, and $y_{u,l}$ represents the vector of frequency domain received signals corresponding to user u, $$Q = \begin{bmatrix} 0 & I_{N_e} \\ I_{2N_d-N_e} & 0 \end{bmatrix},$$

$\tilde{w}_{2N_d}=w_{2N_d}\Theta$, $w_{2N_d}$ is the normalized DFT transform matrix at $2N_d$ point, and $\Theta$ is a diagonal matrix with the diagonal element n being $e^{-j\pi n/N_b/2}$;

Calculating the equalized output $\hat{d}_{u,l}'$ and $\overline{\Omega}_N$ of user u, $$\overline{\Omega}_u = 1 - \frac{\sigma_\eta^2}{2N_d \overline{v}_u} 1_{1\times 2N_d} \tilde{c}_{u,l}^{(3)},$$

$$\hat{d}_{u,l}' = \tilde{W}_{2N_d}^H Q \hat{p}_{u,l}^{(3)} + \overline{\Omega}_u \mu_{u,l},$$

wherein, $(\bullet)^H$ represents conjugate transposition operation, $1_{M\times N}$ represents a matrix of element 1 in M rows and N columns, and $\mu_{u,l}$ represents the reconstructed mean value vector of symbols in block l of user u.

Beneficial effects: The method for generating transmitted signals employed in the OM-OFDM method with cyclic prefix in the present invention can generate OM-OFDM transmitted signals with cyclic prefix, which can reduce signal envelope fluctuations while maintaining the spectral efficiency. With the iterative received signal processing method based on multi-user combined frequency domain equalization in the present invention, the reliability of transmission can be ensured with less complexity.

EMBODIMENTS

Hereunder the OQAM-OFDM transmission method with cyclic prefix in the embodiments of the present invention will be described in detail with reference to the accompanying drawings.

Figure 1:
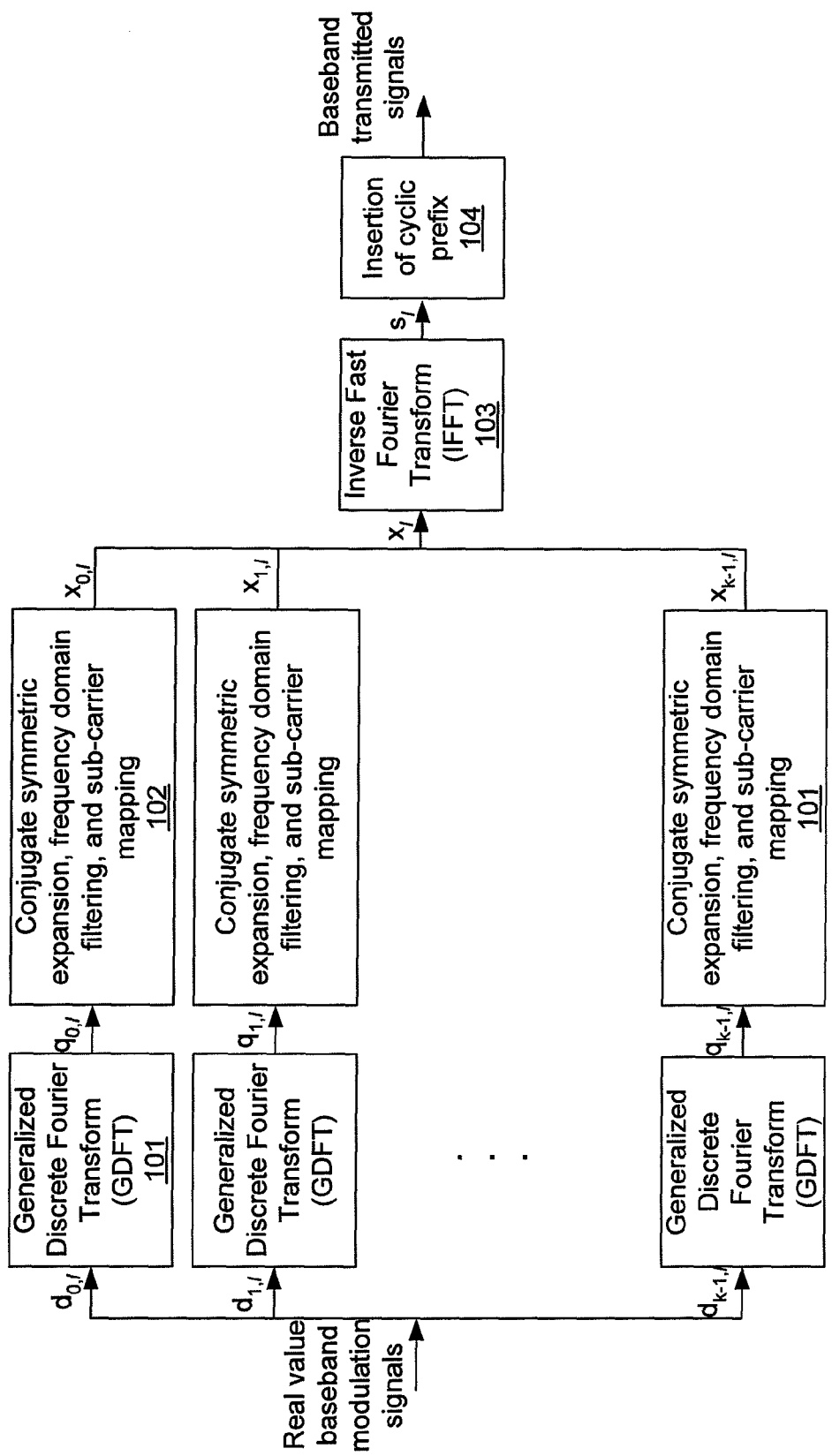
FIG. 1 is a block diagram of the method for generating transmitted OM-OFDM signals with cyclic prefix in the present invention.

The OM-OFDM transmission method with cyclic prefix provided in the embodiment of the present invention can be used in communication systems with wired or wireless channels as a complete method for processing transmitted and received baseband signals. Denote the baseband modulation symbol sequence in real values after baseband mapping as d(m), divide d(m) into K different streams, and split the signals in each stream into blocks in length $2N_d$. Denote the inter-symbol time interval as T/2 and the total bandwidth of the system as B, wherein the expression $N_d/T \leq B$ should be met. Denote the total number of OFDM sub-carriers as $N_c$. Denote the symbol vector of block l in stream k as symbol vector $d_{k,l}$. As shown in FIG. 1, the method for generating transmitted signals provided in the embodiment of the present invention includes:

101: Generalized Discrete Fourier Transform (GDFT)

In the embodiment of the present invention, the GDFT operation is to multiply the element m (i.e., $d_{k,l}(m)$) of $d_{k,l}$ by a modulation factor $e^{-j\pi n/(2N_d)}$, and then perform FFT at $2N_d$ point, to obtain a frequency domain signal vector $q_{k,l}$ in $2N_d$ dimensions of block l in stream k.

102: Conjugate Symmetric Expansion, Frequency Domain Filtering, and Sub-Carrier Mapping In the embodiment of the present invention, the conjugate symmetric expansion is to take the first $N_d$ signals in the frequency domain signal vector $q_{k,l}$, and perform conjugate symmetric expansion for the signals, to obtain a transmitted signal vector $p_{k,l}$ in $N_s=N_d+2N_e$ dimensions of block l in stream k after frequency domain expansion, i.e.:

$$p_{k,l}=[q_{k,l}(N_d-N_e)\ldots q_{k,l}(N_d-1)q_{k,l}(N_d-1)\ldots q_{k,l}*(0) \\ q_{k,l}(0)\ldots q_{k,l}(N_e-1)]^T$$

wherein, $N_e$ is an integer and meets $0 \leq N_e \leq N_d/2$ while $2N_e/N_d$ is called as the roll-off factor of the system.

In the embodiment of the present invention, the frequency domain filtering is to generate dot product of the frequency domain signal $p_{k,l}(i)$ after conjugate symmetric expansion and the coefficient of frequency domain filter $w(i)$, and then multiply the result by $j^k$, and assign the obtained value to the sub-carrier group corresponding to the stream k, i.e.:

$$x_{k,l}(i) = \begin{cases} j^k w(M_k(i))p_{k,l}(M_k(i)) & i \in I_k \\ 0 & i \notin I_k \end{cases}$$

wherein, $M_k(i)$ represents a mapping, i.e., mapping the frequency domain signal $M_k(i)$ to the OFDM sub-carrier i, and, $I_k$ represents the collection of sequence numbers of sub-carriers occupied by the stream k. In the embodiment of the present invention, the value of $w(i)$ is:

$$w(i) = \begin{cases} c(i), & 0 \leq i \leq 2N_e - 1 \\ \sqrt{2}, & 2N_e \leq i \leq N_d - 1 \\ c(N_s - 1 - i), & N \leq i \leq N_s - 1, \end{cases}$$

wherein, $c(i)=\sqrt{1-\cos(\pi(i+0.5)/2/N_e)}$, $0 \leq i \leq 2N_e-1$. Sum up the frequency domain signals in all of the K streams, to obtain the frequency domain transmitted signals, i.e.:

$$x_l(n) = \sum_{k=0}^{K-1} x_{k,l}(n),$$

$$n = 0, \ldots, N_c - 1.$$

The vector form of frequency domain transmitted signals of block l is denoted as $x_l=[x_l(0), x_l(1), \ldots, x_l(N_c-1)]^T$.

103: Inverse Fast Fourier Transform (IFFT)

In the embodiment of the present invention, IFFT is performed for the vector of frequency domain transmitted signals $x_l$ at $N_c$ point to accomplish multi-carrier modulation, to obtain the time domain signals $s_l$ of block l.

104: Insertion of Cyclic Prefix

In the embodiment of the present invention, the procedure of insertion of cyclic prefix is to place the last $N_g$ signals of $s_l$ in the front of $s_l$ to generate the transmitted signals at the transmitting end.

An OQAM-OFDMA transmission method with cyclic prefix that supports K users is provided in the embodiment of the present invention, and the method can be applied in communication between multiple wireless terminals, for example, mobile telephones and a base station. Different users can occupy different frequency bands, so as to obtain FDMA; wherein, the normalized center frequency $f_u$ occupied by user u is $f_u=u/K+f_0$, wherein, $0 \leq f_0 \leq 1/K$. If a communication system that employs the transmission method has $N_c$ sub-carriers, then, $KN_d=N_c$. The frequency selective fading in wireless channels may destroy orthogonality between different user signals at the receiving end. Frequency selective fading will also cause inter-symbol interference for single users. Therefore, a multi-user combined equalization method must be used to eliminate multi-user interference and inter-symbol interference. To resist noise and interference, communication systems usually employ error control coding. At the signal receiving end of base station, in an iterative detection decode receiver where the detector and decoder operate in an iterative mode, the detector employs soft input and soft output. Wherein, soft input and soft output mean that the detector not only can output soft information to the decoder, but also can use the feedback soft information from the decoder as a priori information and input it into the detector.

Figure 2:
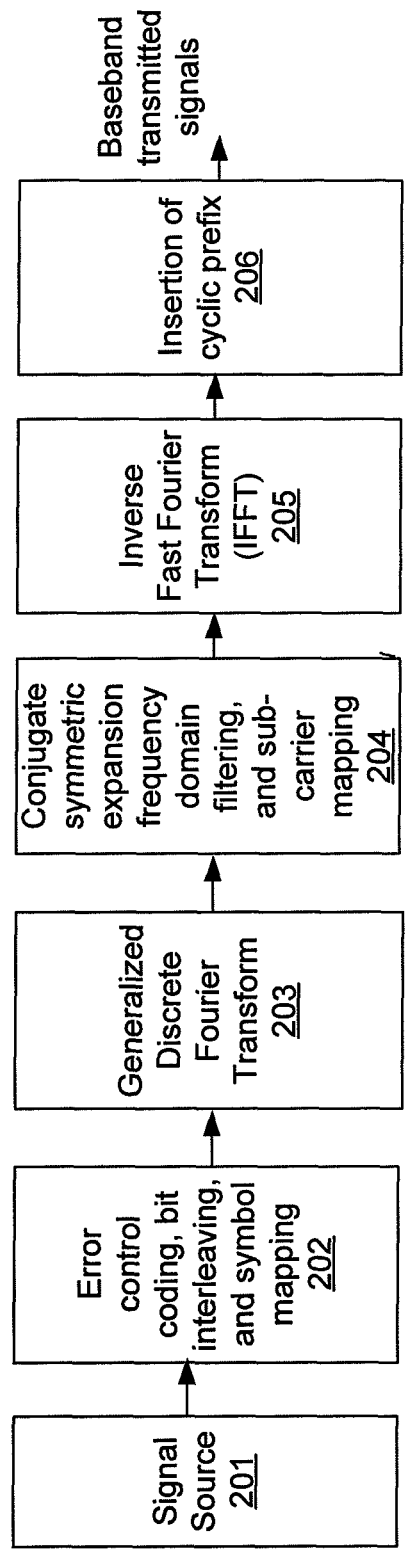
FIG. 2 is a block diagram of the method for generating transmitted OM-OFDMA (Orthogonal Frequency Division Multiple Access) signals with cyclic prefix for single user in the present invention.

As shown in FIG. 2, the method for generating transmitted signals of user u provided in the embodiment of the present invention includes:

201: Signal Source

In the embodiment of the present invention, the signal source generates a bit sequence composed of binary symbols 0, 1, to represent the information to be transmitted.

202: Error Control Coding, Bit Interleaving, and Symbol Mapping

In the embodiment of the present invention, the error control coding is a process of adding redundant information into the binary bit sequence to obtain coded bits, including the well-known Convolutional Code, Turbo Code, and Low Density Parity Code (LDPC), etc. The bit interleaving is to break up the sequence of the coded bits under a specific rule, with a prime interleaver or random interleaver, etc. The symbol mapping is to map the binary bit sequence into baseband symbols in real values by means of pulse amplitude modulation. After mapping, the symbols are divided into blocks in length $2N_b$, the signal m in block l of user u can be represented by $d_{u,l}(m)$, and the vector form thereof can be represented by a vector $d_{u,l}$ in $2N_b$ dimensions.

203: Generalized Discrete Fourier Transform (GDFT)

In the embodiment of the present invention, the GDFT operation is to multiply the element m (i.e., $d_{u,l}(m)$) of $d_{u,l}$ by a modulation factor $e^{-j\pi m/(2N_d)}$, and then perform FFT at $2N_d$ point, to obtain a frequency domain signal vector $q_{u,l}$ in $2N_d$ dimensions of block l of user u.

204: Conjugate Symmetric Expansion, Frequency Domain Filtering and Sub-Carrier Mapping In the embodiment of the present invention, the conjugate symmetric expansion is to take the last $N_d$ signals in the frequency domain signal vector $q_{u,l}$, and perform conjugate symmetric expansion for the signals, to obtain a transmitted signal vector P, in $N_s=N_d+2N_e$ dimensions of block l in the stream after frequency domain extension, i.e.:

$$p_{u,l}=[q_{u,l}(N_d-N_e)\ldots q_{u,l}(N_d-1)q_{u,l}*(N_d-1)\ldots q_{u,l}* \\ (0)q_{u,l}(0)\ldots q_{u,l}(N_e-1)]^T$$

wherein $N_e$ is an integer and meets $0 \leq N_e \leq N_d/2$, while $2N_e/N_d$ called as the roll-off factor of the system. The frequency domain filtering is to generate dot product of the frequency domain signal $p_{u,l}(i)$ after conjugate symmetric expansion and the coefficient of frequency domain filter $w(i)$, and then multiply the result by $j^u$, and assign the obtained value to the sub-carrier group corresponding to the user u, i.e.:

$$x_{u,l}(i) = \begin{cases} j^u w(M_u(i))p_{u,l}(M_u(i)) & i \in I_u \\ 0 & i \notin I_u \end{cases}$$

wherein $M_u(i)$ represents a mapping, i.e., mapping the frequency domain signal $M_u(i)$ to the OFDM sub-carrier i, wherein, $I_u$ represents the collection of sequence numbers of sub-carriers occupied by the stream u. In the embodiment of the present invention, the value of w(i) is:

$$w(i) = \begin{cases} c(i), & 0 \leq i \leq 2N_e - 1 \\ \sqrt{2}, & 2N_e \leq i \leq N_d - 1 \\ c(N_s - 1 - i), & N \leq i \leq N_s - 1, \end{cases}$$

wherein, $c(i)=\sqrt{1-\cos(\pi(i+0.5)/2/N_e)}$, $0 \leq i \leq 2N_e-1$.

205: Inverse Fast Fourier Transform (IFFT)

In the embodiment of the present invention, IFFT is performed for the vector of frequency domain transmitted signals $x_{u,l}$ at $N_c$ point to accomplish multi-carrier modulation, to obtain the time domain signals $s_{u,l}$ in block l of user u.

206: Insertion of Cyclic Prefix

Figure 3:
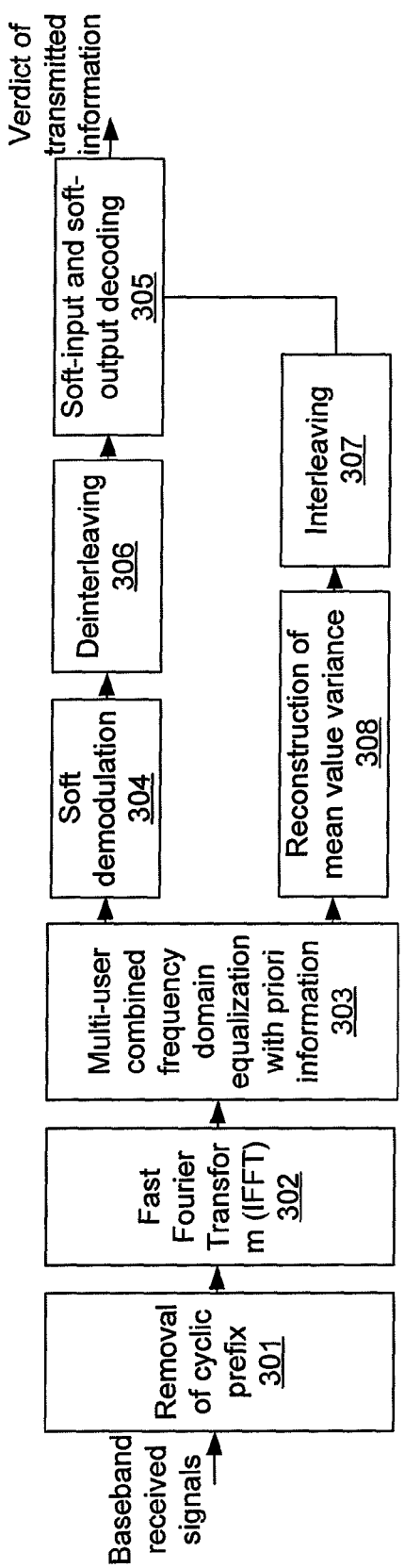
FIG. 3 is a block diagram of the method for processing received OM-OFDMA signals with cyclic prefix.

In the embodiment of the present invention, the procedure of insertion of cyclic prefix is to place the last $N_g$ signals of $s_{u,l}$ in the front of $s_{u,l}$, to generate the transmitted signals of block l of user u As shown in FIG. 3, the method for processing received signals at the base station provided in the embodiment of the present invention includes the following steps.

301: Removal of Cyclic Prefix

In the embodiment of the present invention, the procedure of removing the cyclic prefix is to divide the received signals into blocks in length $N_g+N_c$, and take the last $N_c$ signals, to obtain a time domain received signal vector $r_l$ in $N_c$ dimensions of block l.

302: Fast Fourier Transform (FFT)

In the embodiment of the present invention, Fast Fourier Transform (FFT) is performed for $r_l$ at $N_c$ point, to obtain a frequency domain received signal vector $y_l$ in $N_c$ dimensions.

303: Multi-User Combined Frequency Domain Equalization Utilizing a Priori Information In the embodiment of the present invention, soft input means that the equalizer can use the feedback soft information from the decoder as priori information for input, so as to increase the volume of information. In the embodiment of the present invention, the input frequency domain received signal vector $y_l$ for soft-input equalization is reconstructed by a soft modulator. The multi-user combined soft-input and soft-output equalization includes the following steps:

1) calculating the coefficient of receiving frequency domain filter $w_{u,l}(i)$, wherein, u=0, 1, ..., K-1, i=0, ..., $N_s-1$, $$w_{u,l}(i)=j^u w(i)\xi_{u,l}(M_u^{-1}(i)),$$

wherein, $\xi_{u,l}(n)$ represents the channel parameters of sub-carrier n for block l of user u, $M_u(i)$ represents a mapping, i.e., mapping frequency domain signal $M_u(i)$ to sub-carrier i, and $M_u^{-1}(i)$ represents the inverse mapping;

2) calculating intermediate coefficient vectors $\tilde{c}_{u,l}^{(t)}$, $\hat{c}_{u,l}^{(t)}$, and $\check{c}_{u,l}^{(t)}$ for combined frequency domain equalization, wherein, u=0, 1, ..., K-1, t=1, 2, 3;

$$\tilde{c}_{u,l}^{(1)} = [0_{1\times(N_d-2N_e)}(w_{u,l}^*\square w_{u,l})^T]^T,$$

$$\hat{c}_{u,l}^{(1)} = (\tilde{c}_{((u+1))_K}^{(1)})^* = [0_{1\times(N_d-2N_e)}((w_{((u+1))_K}^{(R)})^*\square w_{((u+1))_K}^{(L)})^T]^T,$$

$$\tilde{c}_{u,l}^{(2)} = \tilde{c}_{u,l}^{(1)} + \tilde{Q}\tilde{c}_{u,l}^{(1)},$$

$$\hat{c}_{u,l}^{(2)} = (\tilde{c}_{((u+1))_K}^{(2)})^* = \hat{c}_{u,l}^{(1)} + \text{diag}(0, J_{2N_e})(\hat{c}_{d,l}^{(1)})^*,$$

$$\tilde{c}_{u,l}^{(3)} = \begin{bmatrix} \Gamma_{((u-1))_K}\left(\tilde{c}_{((u-1))_K,l}^{(2,R)} + \frac{\sigma_\eta^2}{\bar{v}_{((u-1))_K}}1_{N_d\times 1}\right) \\ \Gamma_u\left(\tilde{c}_{((u+1))_K,l}^{(2,L)} + \frac{\sigma_\eta^2}{\bar{v}_{((u+1))_K}}1_{N_d\times 1}\right) \end{bmatrix},$$

$$\hat{c}_{u,l}^{(3)} = -\Gamma_u \hat{c}_{u,l}^{(2)},$$

$$\check{c}_{u,l}^{(3)} = -\Gamma_{((u-1))_K}(\hat{c}_{((u-1))_K,l}^{(2)})^*,$$

wherein, $w_{u,l}=[w_{u,l}(0)w_{u,l}(1) \ldots w_{u,l}(N_s-1)]^T=[(w_{u,l}^{(L)})^T(w_{u,l}^{(M)})^T(w_{u,l}^{(R)})^T]^T$ is the coefficient vector of receiving frequency domain filter, $w_{u,l}^{(L)}$ and $w_{u,l}^{(R)}$ are vectors in $2N_e$ dimensions, (−) represents conjugating operation, and diag (A,B) represents a block diagonal matrix composed of matrix A and B; $\sigma_\eta^2$ is the variance of white noise at the receiving end, $J_N$ represents the inverse identical transform matrix at N points, $\bar{v}_u$ is the mean variance of user u, $\tilde{c}_{u,l}^{(2,L)}$ and $\tilde{c}_{u,l}^{(2,R)}$ are vectors in $N_d$ dimensions that fulfill $[(\tilde{c}_{u,l}^{(2,L)})^T(\tilde{c}_{u,l}^{(2,R)})^T]^T=\tilde{c}_{u,l}^{(2)}$, and $$\tilde{Q} = \begin{bmatrix} J_{2N_d-2N_e} & \\ & J_{2N_e} \end{bmatrix}$$

$$\Gamma_u = \left(\text{diag}\left(\tilde{c}_{u,l}^{(2,R)} + \frac{\sigma_\eta^2}{\bar{v}_u}1_{N_d\times 1}\right)\square\left(\tilde{c}_{((u+1))_K,l}^{(2,L)} + \frac{\sigma_\eta^2}{\bar{v}_{((u+1))_K}}1_{N_d\times 1}\right) - (\hat{c}_{u,l}^{(2)})^*\square\hat{c}_{u,l}^{(2)}\right)^{-1};$$

3) Calculating the intermediate signal vector $\hat{p}_{u,l}^{(t)}$, for combined frequency domain equalization, wherein, u=0, 1, ..., K−1, t=1, 2, 3, $$\hat{p}_{u,l}^{(1)} = Q^T \tilde{W}_{2N_d}\mu_{u,l},$$

$$\hat{p}_{u,l}^{(2)} = \bar{p}_{u,l} + \tilde{Q}(\bar{p}_{u,l})^* - \tilde{c}_{u,l}^{(2)}\square\hat{p}_{u,l}^{(1)} - \begin{bmatrix} \check{c}_{u,l}^{(2)}\square\hat{p}_{((u-1))_K,l}^{(1,R)} \\ \hat{c}_{u,l}^{(2)}\square\hat{p}_{((u+1))_K,l}^{(1,L)} \end{bmatrix},$$

$$\hat{p}_{u,l}^{(3)} = \tilde{c}_{u,l}^{(3)}\square\hat{p}_{u,l}^{(2)} + \begin{bmatrix} \check{c}_{u,l}^{(3)}\square\hat{p}_{((u-1))_K,l}^{(2,R)} \\ \hat{c}_{u,l}^{(3)}\square\hat{p}_{((u+1))_K,l}^{(2,L)} \end{bmatrix},$$

wherein, $\bar{p}_{u,l}^{(t)}=[0_{1\times(N_d-2N_e)}(w_{u,l}^*\square y_{u,l})^T]^T$, and $y_{u,l}$ represents the vector of frequency domain received signals corresponding to user u, $$Q = \begin{bmatrix} 0 & I_{N_e} \\ I_{2N_d-N_e} & 0 \end{bmatrix},$$

$\tilde{W}_{2N_d}=W_{2N_d}\Theta$, $W_{2N_d}$ is the normalized DFT matrix at $2N_d$ point, and $\Theta$ is a diagonal matrix with the diagonal element n being $e^{-j\pi n/N_b/2}$;

4) Calculating the equalized output $\hat{c}_{u,l}'$ and $\bar{\Omega}_u$ of user u, $$\bar{\Omega}_u = 1 - \frac{\sigma_\eta^2}{2N_d \bar{v}_u}1_{1\times 2N_d}\tilde{c}_{u,l}^{(3)},$$

-continued $$\hat{d}'_{u,l} = \tilde{W}^H_{2N_d} Q \hat{p}^{(3)}_{u,l} + \overline{\Omega}_u \mu_{u,l},$$

wherein, $(\bullet)^H$ represents conjugate transposition operation, $1_{M \times N}$ represents a matrix of element 1 in M rows and N columns, and $\mu_{u,l}$ represents the mean value of reconstructed signals in block l of user u.

304: Soft Demodulation

In the embodiment of the present invention, the soft demodulation procedure is to calculate the log likelihood ratio of each coded bit according to the output $\overline{\Omega}_u$ and $\hat{d}_{u,l}'$ of combined frequency domain equalization, and send the log likelihood ratios to a deinterleaver. The log likelihood ratio of bit $b_i$ is calculated with the following formula:

$$L_D(b_i) = \log \frac{\sum_{\alpha: b_i = +1} P(\hat{d}'_{u,l}(m) \mid d_{u,l}(m) = \alpha)}{\sum_{\alpha: b_i = -1} P(\hat{d}'_{u,l}(m) \mid d_{u,l}(m) = \alpha)},$$

wherein, $\alpha$ is the collection of all possible values of $d_{u,l}(m)$, and $$P(\hat{d}'_{u,l}(m) \mid d_{u,l}(m) = \alpha) = \frac{1}{\sqrt{2\pi \phi_{m,i}}} \exp\left\{-\frac{(\hat{d}'_{u,l}(m) - \overline{\Omega}_u \alpha)^2}{2\overline{\Omega}_u (1 - v_m \overline{\Omega}_u)}\right\}.$$

305: Soft-Input and Soft-Output Decoding

In the embodiment of the present invention, the soft-input and soft-output decoding process is to calculate new likelihood ratios according to the different encoding modes at the transmitting end and the likelihood ratios of coded bits output by the soft demodulator, and send the new likelihood ratios to the decoder. For example, soft-output Viterbi decoding for Convolutional Codes, and iterative decoding for Turbo Codes, etc.

306: Deinterleaving

In the embodiment of the present invention, the deinterleaving procedure is a reverse process of the bit interleaving procedure at the transmitting end.

307: Interleaving

In the embodiment of the present invention, the interleaving procedure is to interleave the likelihood ratio of decoded output according to the sequence of bit interleaving at the transmitting end.

308: Reconstruction of Mean Variance

In the embodiment of the present invention, the mean variance reconstruction procedure is to calculate the mean value and mean variance of the symbols according to interleaved likelihood ratio and the symbol mapping at the transmitting end. Denote $b_j$ (j=1, ..., $M_c$) as $M_c$ bits mapped to symbol $d_{u,l}(m)$, $L_c(b_j)$ as the likelihood ratio of decoded output, then, the mean value $\mu(m)$ and $v(m)$ of $d_{u,l}(m)$ can be calculated as follows:

$$\mu(m) = \sum_{\alpha \in X} \alpha P(d_{u,l}(m) = \alpha)$$

$$v(m) = \frac{1}{2N_d} \sum_{m=0}^{2N_d - 1} \left(\left(\sum_{\alpha \in X} |\alpha|^2 P(d_{u,l}(m) = \alpha)\right) - |\mu_{u,l}(m)|^2\right)$$

wherein, $$P(d_{u,l}(m) = \alpha) = \prod_{j=1}^{M_c} \frac{1}{1 + \exp(-b_j L_c(b_j))}.$$

The mean variance can be calculated as follows:

$$\overline{v} = \frac{1}{2N_d} \sum_{k=0}^{2N_d - 1} v(m).$$

In the embodiments of the present invention, it should be appreciated that the method disclosed can be implemented in other ways, without departing from the spirit and scope of the present invention. The embodiments provided here are only exemplary, and are not intended to make any limitation to the present invention, and the content described are not intended to make any limitation to the object of the patent application. For example, a plurality of units or components can be combined or can be integrated in another system, or some features can be omitted, or excluded from execution.

Above described are only some preferred embodiments of the present invention, and the present invention is not limited thereto. Those skilled in the art can easily make various variations and modifications without departing from scope of the present invention as defined by the accompanying claims.

The invention claimed is:

1. An offset modulation-orthogonal frequency division multiplexing (OM-OFDM) transmission method with cyclic prefix, wherein the transmission method includes a method for generating transmitted signals and a method for processing received signals, wherein, the method for generating transmitted signals includes the following steps:

a. performing channel encoding and symbol mapping for the transmitted information bits, to obtain digital baseband modulation symbols with real values;

b. dividing the digital baseband modulation symbols into K streams, wherein, K is a positive integer;

c. performing serial/parallel conversion in length $2N_d$ for the digital baseband modulation symbols in stream k, to obtain a transmitted symbol vector $d_{k,l}$ length $2N_d$ in the stream, wherein, $N_d$ is a positive integer, suffix l represents sequence number of block, $d_{k,l} = [d_{k,l}(0), \ldots d_{k,l}(2N_d-1)]^T$, and $(\bullet)^T$ represents conjugate transposition operation;

d. performing cyclic convolution for the transmitted symbols in each stream with the coefficient of time domain pulse shaping filter for the stream, and modulating the result in offset quadrature amplitude modulation (OQAM) mode to the frequency band corresponding to the stream, to obtain the digital baseband signals in the stream;

e. combining the digital baseband signals on all streams by summing, to obtain the transmitted signals, to which a cyclic prefix will be inserted later;

f. inserting a cyclic prefix, to obtain digital baseband transmitted signals; and wherein, the method for processing received signals includes the following steps:

g. removing the cyclic prefix from the received signals;

h. performing band-pass filtering for the received signals for each stream, and performing combined equalization for multi-streams, perform demodulation and decoding.

2. The OM-OFDM transmission method with cyclic prefix according to claim 1, wherein, the procedure of generating digital baseband transmitted signals from the transmitted symbol vectors $d_{k,l}$ of K streams (k=0, ... K−1) includes the following steps:

multiplying the element n in $d_{k,l}$ by a modulation factor $e^{-j\pi n/(2N_d)}$, wherein, n=0, ... $2N_d-1$, $j=\sqrt{-1}$; then, performing Fast Fourier Transform (FFT) at $2N_d$ point for the resultant vector, to obtain a frequency domain transmitted signal vector $q_{k,l}$, wherein, $q_{k,l}=[q_{k,l}(0), \ldots, q_{k,l}(2N_d-1)]^T$;

taking the first $N_d$ signals in the frequency domain transmitted signal vector $q_{k,l}$, and performing conjugate symmetric expansion for the signals, to obtain transmitted signal vector $p_{k,l}$ after frequency domain expansion in $N_s = N_d + 2N_e$ dimensions, as follows:

$$p_{k,l} = [q_{k,l}(N_d-N_e) \ldots q_{k,l}(N_d-1) q_{k,l}*(N_d-1) \ldots q_{k,l}*(0) q_{k,l}(N_e-1)]^T,$$

wherein, $N_e$ is a non-negative integer which is not greater than $N_d/2$;

multiplying the element i in the transmitted signal vector $p_{k,l}$ after frequency domain expansion by the coefficient of frequency domain filter w(i), and then multiplying the result by $j^k$, and assigning the obtained value to the element $((kN_d + k_0 - \lfloor N_d/2 \rfloor - N_e + i))_{N_c}$ in a vector $x_{k,l}$ in $N_c$ dimensions, with all other elements in $x_{k,l}$ being set to 0, wherein, $k_0$ is an integer, $N_c$ is the total number of sub-carriers in the system, and $((M))_N$ represents the remainder of M divided by N;

Summing up $x_{k,l}$ generated in each stream to obtain $x_l$, performing Inverse Fast Fourier Transform (IFFT) at $N_c$ point to obtain $s_l$, and then after serial/parallel conversion, inserting a cyclic prefix, to generate transmitted signals.

3. The OM-OFDM transmission method with cyclic prefix according to claim 2, wherein, the coefficient of frequency domain filter w(i) is:

$$w(i) = \begin{cases} c(i), & 0 \le i \le 2N_e - 1 \\ \sqrt{2}, & 2N_e \le i \le N_d - 1 \\ c(N_s - 1 - i), & N \le i \le N_s - 1, \end{cases}$$

wherein, $c(i) = \sqrt{1 - \cos(\pi(i+0.5)/2N_e)}$, $0 \le i \le 2N_e - 1$, and $\pi$ is circumference ratio.

4. A multi access transmission method based on offset modulation-orthogonal frequency division multiplexing (OM-OFDM) with cyclic prefix, including a method for generating transmitted signals and a method for processing received signals, wherein, the method for generating transmitted signals of user u includes the following steps:

4a. performing channel encoding and symbol mapping for the transmitted information bits, to obtain digital baseband modulation symbols with real values;

4b. performing serial/parallel conversion in length $2N_d$ for the digital baseband modulation symbols, to obtain transmitted symbol vector $d_{u,l}$, wherein N is a positive integer, d is a transmitted symbol vector, suffix u indicates a user, and suffix l represents sequence number of block;

4c. performing cyclic convolution for the transmitted symbols with the coefficient of pulse shaping filter for the user, and modulating the result in offset quadrature amplitude modulation (OQAM) mode to the frequency band corresponding to the user, to obtain the digital baseband signals of the user;

4d. inserting a cyclic prefix, to obtain digital baseband transmitted signals; wherein, the method for processing received signals includes the following steps:

4e. removing the cyclic prefix from the received signals;

4f. performing band-pass filtering for the received signals for each user, and performing combined frequency domain equalization for multi-user, performing demodulation and decoding.

5. The multi access transmission method based on OM-OFDM with cyclic prefix according to claim 4, wherein, in the method for generating transmitted signals, the procedure of generating digital baseband transmitted signals from transmitted symbol vector $d_{u,l}$ includes the following steps:

multiplying the element n in $d_{u,l}$ by a modulation factor $e^{-j\pi n/(2N_d)}$, wherein, n=0, ... $2N_d-1$, $j=\sqrt{-1}$; then, performing Fast Fourier Transform (FFT) at $2N_d$ point for the resultant vector, to obtain a frequency domain signal vector $q_{u,l}$;

taking the first $N_d$ signals in the frequency domain transmitted signal vector $q_{u,l}$, and performing conjugate symmetric expansion for the signals, to obtain a transmitted signal vector $p_{u,l}$ after frequency domain expansion in $N_s = N_d + 2N_e$ dimensions, $$p_{u,l} = [q_{u,l}(N_d-N_e) \ldots q_{u,l}(N_d-1) q_{u,l}*(N_d-1) \ldots q_{u,l}*(0) q_{u,l}(N_e-1)]^T,$$

wherein, $N_e$ is a non-negative integer not greater than $N_d/2$;

multiplying the element i in the transmitted signal vector $p_{u,l}$ after frequency domain expansion by the coefficient of frequency domain filter w(i), and then multiplying the result by $j^u$, and assigning the obtained value to the element $((uN_d + k_0 - \lfloor N_d/2 \rfloor - N_e + i))_{N_c}$ of vector $x_{u,l}$ in $N_c$ dimensions, with all other elements in $x_{u,l}$ being set to 0, wherein, $k_0$ is an integer that is identical for all users, $N_c$ is the total number of sub-carriers in the system, and $((M))_N$ represents the remainder of M divided by N.

6. The multi access transmission method based on OM-OFDM with cyclic prefix according to claim 4, wherein, in the method for processing received signals, the procedure of performing band-pass filtering for each user and performing multi-user combined frequency domain equalization, demodulation, and decoding is processed with an iterative detection decoding method based on multi-user combined equalization, and includes:

performing Fast Fourier Transform (FFT) at $N_c$ points for the received signals after the cyclic prefix is removed;

performing multi-user combined frequency domain equalization with priori information;

performing soft demodulation to calculate the bit log likelihood ratio according to the equalized output;

performing soft-input and soft-output decoding;

calculating the mean value and variance reconstruction of the transmitted symbols according to the bit log likelihood ratio of the decoder output.

7. The multi access transmission method based on OM-OFDM with cyclic prefix according to claim 6, wherein, the procedure of performing multi-user combined frequency domain equalization utilizing priori information includes:

calculating the coefficient of receiving frequency domain filter $w_{u,l}(i)$ according to the mapping relation between sub-carriers at the transmitting end and channel parameters, wherein, u=0, 1, ..., K−1, i=0, ..., $N_s-1$;

calculating intermediate coefficient vectors $\tilde{c}_{u,l}^{(t)}$, $\hat{c}_{u,l}^{(t)}$, and $\check{c}_{u,l}^{(t)}$ for combined frequency domain equalization according to the coefficient of frequency domain filter, wherein, u=0, 1, ..., K−1, t=1, 2, 3;

calculating intermediate signal vector $\hat{p}_{u,l}^{(t)}$, for combined frequency domain equalization according to the signals of each user after band-pass filtering and the intermediate coefficient vectors $\tilde{c}_{u,l}^{(t)}$, $\hat{c}_{u,l}^{(t)}$, and $\check{c}_{u,l}^{(t)}$ for frequency domain equalization, wherein, u=0, 1, ..., K−1, t=1, 2, 3;

obtaining the equalized output $\hat{d}'_{u,l}$ and $\overline{\Omega}_u$ of user u, according to the intermediate coefficient vectors for combined frequency domain equalization, intermediate signal vector for combined frequency domain equalization, noise variance, and reconstructed mean value and mean variance of transmitted symbols.

\* \* \* \* \*